(12) United States Patent
Lee et al.

(10) Patent No.: US 10,819,159 B2
(45) Date of Patent: Oct. 27, 2020

(54) METHODS OF WIRELESS POWER TRANSFER BY ENERGY SIGNAL TRANSFER APPARATUS OPERATING IN THE SAME FREQUENCY BAND AS WIRELESS LOCAL AREA NETWORK IN WIRELESS POWER TRANSFER ENERGY HARVESTING SYSTEM AND ENERGY SIGNAL TRANSFER APPARATUSES FOR PERFORMING THE SAME

(71) Applicant: Research & Business Foundation Sungkyunkwan University, Suwon-si (KR)

(72) Inventors: Tae-Jin Lee, Suwon-si (KR); Young Il Cho, Suwon-si (KR); Ji Hyoung Ahn, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 177 days.

(21) Appl. No.: 16/136,448

(22) Filed: Sep. 20, 2018

(65) Prior Publication Data

US 2019/0089204 A1 Mar. 21, 2019

(30) Foreign Application Priority Data

Sep. 20, 2017 (KR) .......................... 10-2017-0121257

(51) Int. Cl.
*H02J 50/20* (2016.01)
*H04W 52/44* (2009.01)
(Continued)

(52) U.S. Cl.
CPC ............ *H02J 50/20* (2016.02); *H04B 5/0037* (2013.01); *H04W 52/248* (2013.01); *H04W 52/44* (2013.01); *H04W 84/12* (2013.01)

(58) Field of Classification Search
CPC ......... H02J 50/20; H02J 50/80; H04W 52/44; H04W 52/248; H04W 84/12; H04B 5/0037
See application file for complete search history.

(56) References Cited

U.S. PATENT DOCUMENTS

2012/0274154 A1* 11/2012 DeLuca .................. H02J 50/80
  307/149
2013/0175873 A1 7/2013 Kwon et al.
(Continued)

FOREIGN PATENT DOCUMENTS

| KR | 10-2013-0081776 A | 7/2013 |
| KR | 10-2017-0071944 A | 6/2017 |
| WO | 2012/003142 A2 | 1/2012 |

OTHER PUBLICATIONS

Youngil Cho et al., "MAC Protocol for Wireless Power Transfer Using Spatial Reuse and Energy Beamforming", *Proceedings of the Summer Conference of the Korean Institute of Communication and Information*, Jun. 2017, Jeju, Republic of Korea 1616-1617 (3 pages in English, 3 pages in Korean).

(Continued)

*Primary Examiner* — Jared Fureman
*Assistant Examiner* — Duc M Pham
(74) *Attorney, Agent, or Firm* — NSIP Law

(57) ABSTRACT

Disclosed is a method of wireless power transfer to at least one wireless station connected to a network from an energy signal transfer apparatus operating in the same frequency band as a wireless local area network (WLAN). The method includes: receiving an energy transfer request from a first wireless station connected to the network; calculating the direction of energy signal transfer in response to the energy transfer request; and sending an energy signal to the first wireless station in the calculated direction of energy signal transfer for the duration of energy transfer. The energy signal transfer apparatus allows for power transfer without causing interference with data transmission on a channel where data transmission occurs, by transferring energy only in the direction of stations requesting energy transfer by beamforming technology.

16 Claims, 13 Drawing Sheets

(51) Int. Cl.
  *H04W 52/24*   (2009.01)
  *H04B 5/00*    (2006.01)
  *H04W 84/12*   (2009.01)

(56) References Cited

U.S. PATENT DOCUMENTS

2015/0099538 A1\*  4/2015  Wang ................. H04W 64/003
                                                       455/456.1
2015/0112412 A1    4/2015  Anderson et al.
2016/0301256 A1\* 10/2016  Zeine .................... G06F 1/1698
2017/0179774 A1    6/2017  Jin et al.
2018/0242176 A1\*  8/2018  Yang ................. H04W 74/0808

OTHER PUBLICATIONS

Notice of Allowance dated Jul. 30, 2019 in Corresponding Korean Patent Application No. 10-2017-0121257 (5 pages in Korean).
Nitsche T., et al., "IEEE 802.11 ad: Directional 60 GHz Communication for Mulit-Gigabit-per-Second Wi-Fi", *IEEE Communications Magazine*, vol. 52 Issue 12, Dec. 2014, pp. 132-141 (10 pages in English).
Korean Office Action dated Jan. 21, 2019 in Corresponding Korean Patent Application No. 10-2017-0121257 (5 pages in Korean).

\* cited by examiner

METHODS OF WIRELESS POWER TRANSFER BY ENERGY SIGNAL TRANSFER APPARATUS OPERATING IN THE SAME FREQUENCY BAND AS WIRELESS LOCAL AREA NETWORK IN WIRELESS POWER TRANSFER ENERGY HARVESTING SYSTEM AND ENERGY SIGNAL TRANSFER APPARATUSES FOR PERFORMING THE SAME

CROSS-REFERENCE TO RELATED APPLICATIONS

This application claims priority to Korean Patent Application No. 10-2017-0121257 filed on Sep. 20, 2017 in Korea, the entire contents of which are hereby incorporated by reference in their entirety.

BACKGROUND OF THE INVENTION

Field of the Invention

The present invention relates to wireless power transfer, and more particularly, to a method of wireless power transfer to at least one wireless station connected to a network from an energy signal transfer apparatus operating in the same frequency band as a wireless local area network (WLAN), and the energy signal transfer apparatus for performing the same.

Related Art

In an Internet of things (IoT) environment, energy harvesting is the technology by which the battery life limitations of wireless communication apparatuses can be overcome. Energy harvesting is the technology for generating energy by a wireless communication apparatus through the use of ambient heat, solar light, wind, vibrations, magnetic energy, etc. as energy sources. Unlike energy harvesting, wireless power transfer involves intentionally supplying energy sources. One of the wireless power transfer technologies that uses RF signals as an energy source is attracting attention as a core technology for overcoming battery life limitations in a future IoT wireless network environment.

In the conventional power transfer technology using radio frequency signals, energy RF signals are radiated using an omnidirectional antenna, and the energy RF signals spread out in all directions from a source of radio waves. Due to this, path loss occurs where signal strength is attenuated as the distance increases, even without an obstacle, thus resulting in low energy transfer efficiency. Moreover, in the conventional power transfer technology using radio frequency signals, if a data signal and an energy RF signal are transmitted in the same frequency band, the energy signal and the data signal may be sent simultaneously because power transfer from a power beacon (PB) does not require checking whether the channel is busy or not. In this case, the energy signal become a noise signal to the data receiving station, thus disturbing normal data communication and reducing data communication throughput. Stations using distributed coordination function (DCF) based on 802.11 CSMA/CA (carrier sense multiple access with collision avoidance) WLAN standard as a medium access control (MAC) protocol detect the channel status before sending data and perform communication only when the channel is idle. Thus, upon detecting an energy RF signal during power transfer, the stations determine the channel to be busy. Since there is no data transmission while the channel is busy, network data throughput is reduced and latency time is increased.

The recent RF wireless transfer technology employs energy beamforming to overcome the low energy transfer efficiency. Beamforming is the technology for concentrating received power strength at a desired point through signal overlap by controlling the phase and amplitude of each transmission antenna signal by using multiple antennas. By utilizing beamforming in RF wireless power transfer, energy RF signals can be concentrated at a particular point, thereby improving the energy transfer efficiency at the desired point. Moreover, the frequency channel may be spatially separated using this characteristic, thereby minimizing interference with data signals. This minimizes interference to the data receiving station, and allows the data transmitting stations to transmit data even while power is transferred, since they do not sense the channel to be busy. However, transmitting an energy signal to the same receiving station as a data signal by using beamforming technology may be problematic in that, the energy signal may act as an interference signal to the receiving station and the data transmitting stations may sense the channel to be busy.

FIG. 1 is a conceptual diagram of a conventional RF wireless power transfer technique in which power is transferred using an omnidirectional antenna when data transmission and energy transfer are performed on the same frequency channel.

Referring to FIG. 1, the power beacon (PB) 20 transfers RF wireless power in all directions by using an omnidirectional antenna, and an energy RF signal transferred by the power beacon (PB) 20 is transmitted to a first station 30 and a second station 40. In the power transfer using an omnidirectional antenna shown in FIG. 1, it is difficult for an AP (access point) 10 receiving a data signal 12 from the first station 30 to properly receive the data signal 12 sent by the first station 30 due to interference with the energy RF signal from the power beacon (PB) 20, and the energy reception efficiency is low due to the attenuation of received power strength with respect to distance even though the second station 40 harvests energy from the energy RF signal sent by the power beacon (PB) 20.

SUMMARY OF THE INVENTION

The present invention provides a method of wireless power transfer by an energy signal transfer apparatus operating in the same frequency band as a wireless local area network (WLAN), that allows for data transmission without interference from an energy RF signal when an energy harvesting station using RF signals as an energy source uses a channel for data transmission, and the energy signal transfer apparatus for performing the same.

In one aspect of the present invention, there is provided a method of wireless power transfer to at least one wireless station connected to a network from an energy signal transfer apparatus operating in the same frequency band as a wireless local area network (WLAN), the method including: receiving an energy transfer request from a first wireless station connected to a network; calculating a direction of energy signal transfer in response to the energy transfer request; and sending an energy signal to the first wireless station in the calculated direction of energy signal transfer for the duration of energy transfer.

If a wireless channel is used for data transmission, the first wireless station requesting energy transfer is a wireless station that has failed a data transmission contention.

If the wireless channel is not used for data transmission, the first wireless station requesting energy transfer is a wireless station that senses a wireless channel free.

The first wireless station uses an Excuse frame when sending the energy transfer request, and the Excuse frame includes an address of a power beacon (PB) serving as the energy signal transfer apparatus and an address of the first wireless station requesting energy transfer.

The calculating of the direction of energy signal transfer in response to the energy transfer request includes calculating the direction of energy signal transfer and the duration of energy transfer by checking the address of the first wireless station requesting energy transfer through the Excuse frame.

The calculating of the direction of energy signal transfer and the duration of energy transfer determines the duration of energy transfer based on the time when a wireless channel's data transmission—that is, ACK (acknowledgment) frame transmission—ends.

If the wireless channel is used for data transmission, the calculated direction of energy signal transfer is a direction that causes no interference with the data transmission, and if the wireless channel is not used for data transmission, other wireless stations in the network are notified of the duration of energy transfer and the direction of energy signal transfer through a PB Info frame before energy signal transfer, the PB Info frame including the address of the PB, the address of the first wireless station requesting energy transfer, and the duration of energy transfer, in addition to a basic MAC frame structure.

The energy signal transfer apparatus is one of a power beacon (PB), an access point (AP) and a wireless station.

In another aspect of the present invention, there is provided an energy signal transfer apparatus for performing wireless power transfer to at least one wireless station connected to a network in the same frequency band as a wireless local area network (WLAN), the energy signal transfer apparatus including: a receiver for receiving an energy transfer request from a first wireless station connected to a network; a processor for calculating at least either a direction of energy signal transfer or the duration of energy transfer in response to the energy transfer request; and a transmitter for sending an energy signal to the first wireless station in the calculated direction of energy signal transfer.

The transmitter sends an energy signal in the calculated direction of energy signal transfer during the duration of energy transfer.

The receiver receives an Excuse frame from the first wireless station, which is transmitted when the energy transfer request is sent, the Excuse frame comprising the address of a power beacon (PB) serving as the energy signal transfer apparatus and the address of the first wireless station requesting energy transfer, wherein the processor calculates the direction of energy signal transfer and the duration of energy transfer by checking the address of the first wireless station requesting energy transfer through the Excuse frame.

The processor determines the duration of energy transfer based on the time when a wireless channel's data transmission—that is, ACK (acknowledgment) frame—ends.

If the wireless channel is used for data transmission, the calculated direction of energy signal transfer is a direction that causes no interference with the data transmission, and if the wireless channel is not used for data transmission, other wireless stations in the network are notified of the duration of energy transfer and the direction of energy signal transfer through a PB Info frame before energy signal transfer, the PB Info frame comprising the address of the PB, the address of the first wireless station requesting energy transfer, and the duration of energy transfer, in addition to a basic MAC frame structure.

The energy signal transfer apparatus is either a power beacon (PB) or an access point (AP) or a wireless station.

Figure 1:
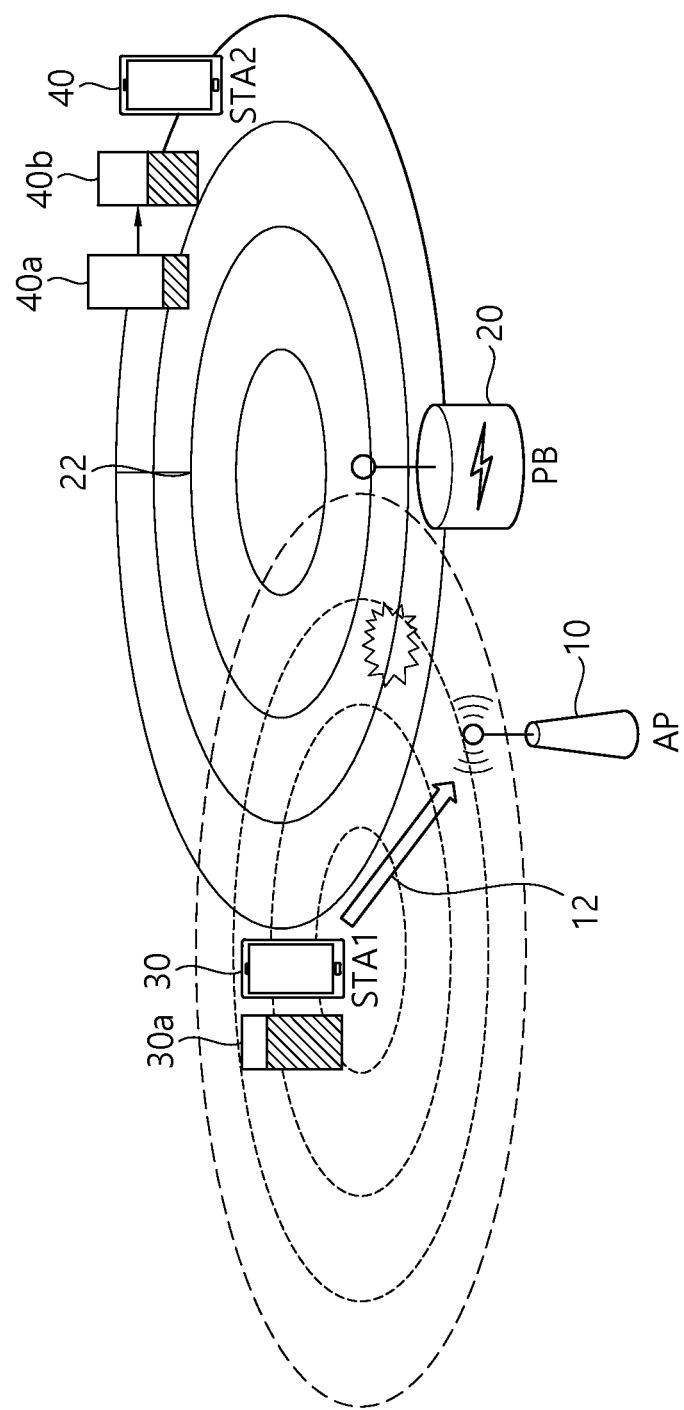
FIG. 1 is a conceptual diagram of a conventional RF wireless power transfer technique in which power is transferred using an omnidirectional antenna when data transmission and energy transfer are performed on the same frequency channel.

DESCRIPTION OF EXEMPLARY
EMBODIMENTS

The present disclosure may be modified in various forms and may have a variety of embodiments, and, therefore, specific embodiments will be illustrated in the drawings and explained in detail.

The embodiments, however, are not to be taken in a sense for limiting the present disclosure to the specific embodiments, and should be construed to include modifications, equivalents, or substitutions within the spirit and technical scope of the present disclosure.

Also, the terms including ordinal numbers such as "first," "second," and the like used herein can be used to describe various components, but the components are not limited by these terms. The terms are used only for the purpose of distinguishing one component from another component. For example, without departing from the scope of the present disclosure, a first component may be referred to as a second component, and similarly, the second component may also be referred to as the first component. The term "and/or" includes a combination of a plurality of related listed items or any one item of the plurality of related listed items.

When a component is referred to as being "connected," or "coupled" to other component, it may be directly connected or coupled to the other component, but it should be understood that another component may exist between the component and the other component. Contrarily, when a component is referred to as being "directly connected," or "directly coupled" to other component, it should be understood that another component may be absent between the component and the other component.

The terms used herein are employed to describe only specific embodiments and are not intended to limit the present disclosure. Unless the context clearly dictates otherwise, the singular form includes the plural form. It should be understood that the terms of "comprise" and "have" specify the presence of stated herein features, numbers, steps, operations, elements, components, or a combination thereof, but do not preclude the presence or probability of addition of one or more another features, numbers, steps, operations, elements, components, or a combination thereof.

Unless otherwise defined, all terms including technical and scientific terms used herein have the same meaning as commonly understood by one of ordinary skill in the art to which this disclosure belongs. Terms, such as those defined in commonly used dictionaries, should understood as being interpreted as having a meaning that is consistent with their meaning in the context of the relevant art and not being interpreted in an idealized or overly formal sense unless expressly so defined herein.

Hereinafter, exemplary embodiments of the present disclosure will be described in detail with reference to the drawings. In describing the present invention, the same reference numerals are used to designate the same or similar components, and redundant descriptions thereof are omitted for easier overall understanding.

In an exemplary embodiment of the present invention, when an RTS (Request-to-send) frame and a CTS (Clear-to-send) frame are exchanged between a station that has won in a contention for data transmission and a receiving station, to notify that the channel is busy, other stations which have lost in the contention are allotted a time to send an energy transfer request.

The stations that have lost in the contention send an energy transfer request to the power beacon (PB) through contention within the time allotted by the system. In this case, an Excuse frame according to an exemplary embodiment of the present invention may be used. Energy transfer from the power beacon (PB) uses RF energy signals using beamforming technology.

The system may set an energy contention window size according to the number of stations connected to the network, in order to reduce the time required for Excuse frame transmission contention. When the Excuse frame is successfully transmitted to the power beacon (PB), the power beacon (PB) may determine the direction of energy transfer in which there is no interference with data transmission, through the Excuse frame, and may determine the duration of energy transfer based on the time when the data transmission ends, to ensure that the channel is used for data transmission.

The Excuse frame is transmitted when the channel is occupied for data transmission after the exchange of the RTS frame and the CTS frame, and data is transmitted when the Excuse frame is sent or after a period of time allotted by the system to send an energy transfer request after transmission of the CTS frame. If a station senses the channel to be idle for an EDIFS (energy DCF Interframe Space) interval, it then may decide that the channel is not used for data transmission and send an energy transfer request to the power beacon (PB).

Figure 2:
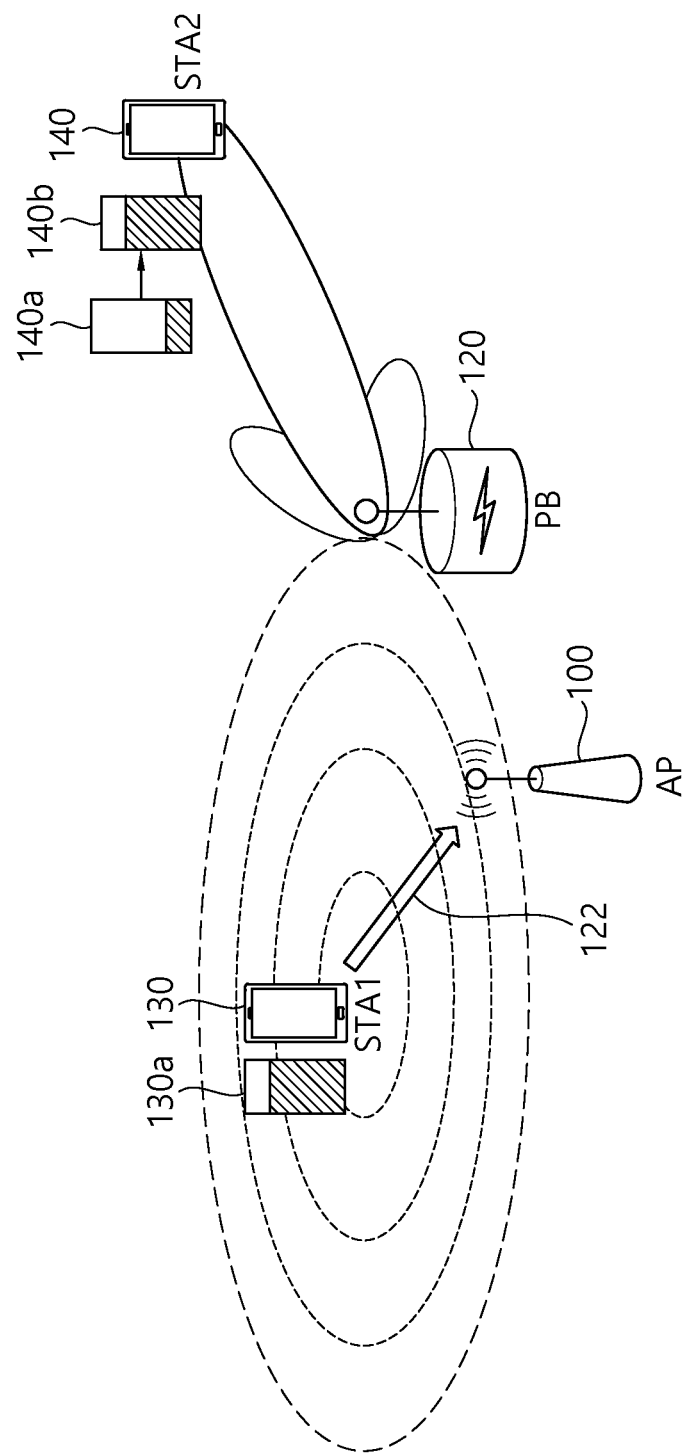
FIG. 2 is a conceptual diagram of a method of RF wireless power transfer using beamforming technology according to an exemplary embodiment of the present invention.

FIG. 2 is a conceptual diagram of a method of RF wireless power transfer using beamforming technology according to an exemplary embodiment of the present invention.

Referring to FIG. 2, the power beacon (PB) 120 performs RF wireless power transfer by transmitting an energy RF signal using beamforming technology.

Once the RF wireless power transfer using beamforming technology is performed as shown in FIG. 2, normal data transmission is enabled since an access point (AP) 100 receives only a data signal 122 from the first station 130, and the second station 140 may harvest larger amounts of energy compared to the conventional art since it receives an energy RF signal with high power strength.

In the present invention, a network consists of one AP, a plurality of a plurality (n) of stations that harvest energy using RF signals as a source of energy, and one power beacon (PB) that transmits an energy RF signal through beamforming technology, and it is assumed that the AP, the stations, and the power beacon (PB) all operate in the same frequency band.

According to an exemplary embodiment of the present invention, the PB may be mounted on an AP or station, and the following description will be made on the assumption that the PB exists as an independent apparatus.

A station's occupation of a channel for data transmission works in the same way as the existing DCF. The station listens for the channel status for a DIFS (DCF Interframe space) interval before transmitting data. If the channel is found busy, the station then waits until the channel becomes free. If the channel is found idle during the DIF interval, the station sets a random backoff value within a contention window (w) set by the AP when accessing the network, and decrements the backoff value by 1 for each backoff time slot (δ) if the channel is free. When the backoff value reaches 0, an RTS frame is sent to the AP. If the RTS frame is successfully received, the AP sends a CTS frame to notify the stations connected to the network that the channel is occupied for data transmission. If two or more stations simultaneously send an RTS frame, the RTS frames collide with each other and cannot be successfully received by the AP, and therefore the AP does not send a CTS frame. Depending on whether the CTS frame is sent or not, the stations that have sent an RTS frame may determine whether the RTS frames have collided with each other or not. Upon detecting the collision of the RTS frames, the stations use binary exponential backoff to attempt to transmit data by re-setting the random backoff value by doubling the contention window size, in order to reduce the probability of collision. A station that has succeeded in data transmission resets the backoff window size and tries to transmit the next data.

Figure 3:
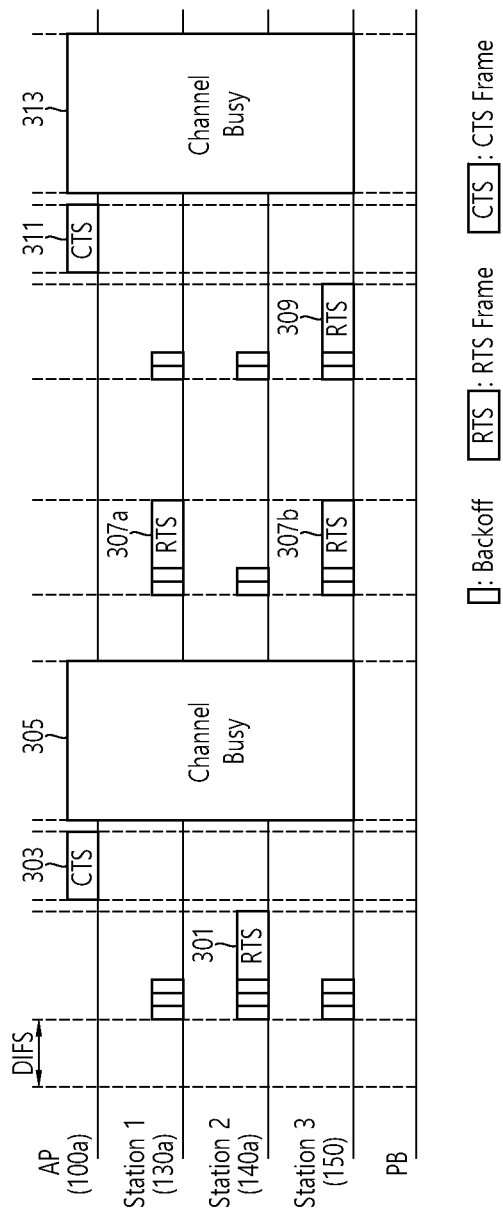
FIG. 3 is a timing diagram of an example of channel occupation and DCF operation for data transmission in a network where three stations are connected to one AP.
Figure 3:
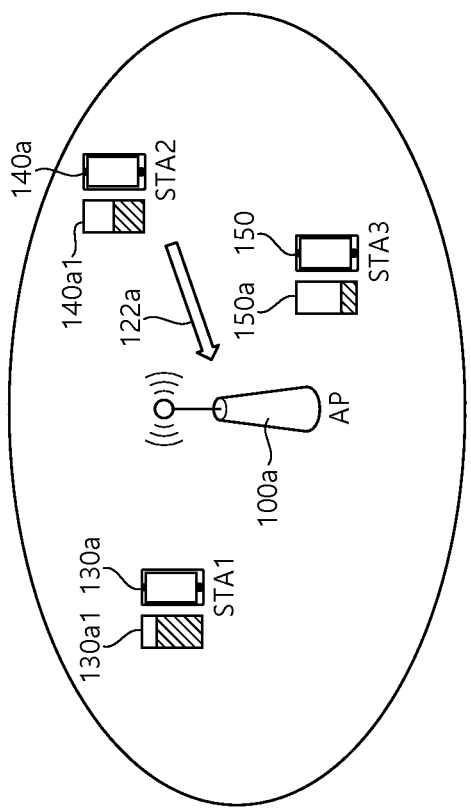

FIG. 3 is a timing diagram of an example of channel occupation and DCF operation for data transmission in a network where three stations are connected to one AP.

Referring to FIG. 3, each station 130*a*, 140*a*, and 150 senses the channel to be idle during a DIFS before transmitting data and then sets a random backoff value. The second station 140*a*—the station whose backoff value reaches 0 first—sends an RTS frame. If the AP 100*a* successfully receives the RTS frame and sends a CTS frame, the channel is occupied for data transmission. Afterwards, if the channel is found idle again during a DIFS, each station 130a, 140a, and 150 decrements their backoff value again. If the first station 130a and third station 150 simultaneously send an RTS frame since their backoff values reach 0 at the same time, the RTS frames are not successfully received by the AP 100a due to collision of the RTS frames, and the AP 100a does not send a CTS frame. The first station 130a and the third station 150 find out that the RTS frames have collided, based on the fact that they have not received a CTS frame, and try to re-transmit data by doubling the contention window size.

A station that has won in a data transmission contention—the second station 140a in FIG. 3—does not transmit data immediately upon receiving a CTS frame after sending an RTS frame, but waits for the stations that have failed the data transmission contention—the first station 130a and third station 150 in FIG. 3—to send an energy transfer request frame. The stations that have failed the contention send an energy transfer request to the power beacon PB by using the Excuse frame of the present invention.

Figure 4:
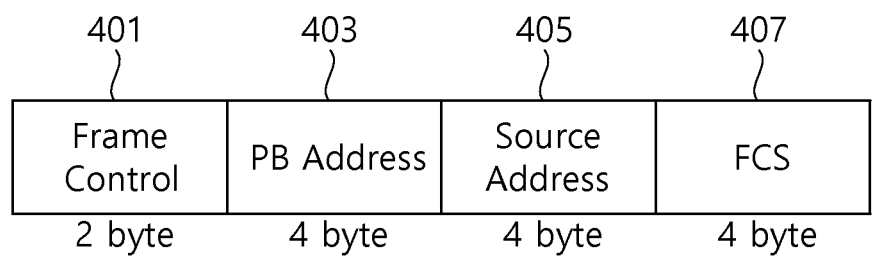
FIG. 4 shows an Excuse MAC frame structure according to an exemplary embodiment of the present invention.

FIG. 4 shows an Excuse MAC frame structure according to an exemplary embodiment of the present invention. Referring to FIG. 4, the Excuse MAC frame includes a frame control 401, a power beacon (PB) address 403, a source address 405, and a frame check sequence (FCS) 407. The Excuse frame includes the address 403 of the power beacon PB and the source address 405 containing information on a station requesting energy transfer.

Upon receiving a CTS, stations that have failed a contention set a random backoff value within an energy contention window (We) allocated by the AP when accessing the network, and tries to send an Excuse frame. When n stations are connected to the network, the number of stations participating in an Excuse frame transmission contention is n−1, and the probability $P_{eh}$ of a particular station's success in the Excuse frame transmission is calculated by Equation 1:

$$P_{eh} = \sum_{k=0}^{W_e-1} (n-1)\frac{1}{W_e}\left(1 - \frac{k+1}{W_e}\right)^{(n-1)-1} \quad \text{[Equation 1]}$$

Figure 5:
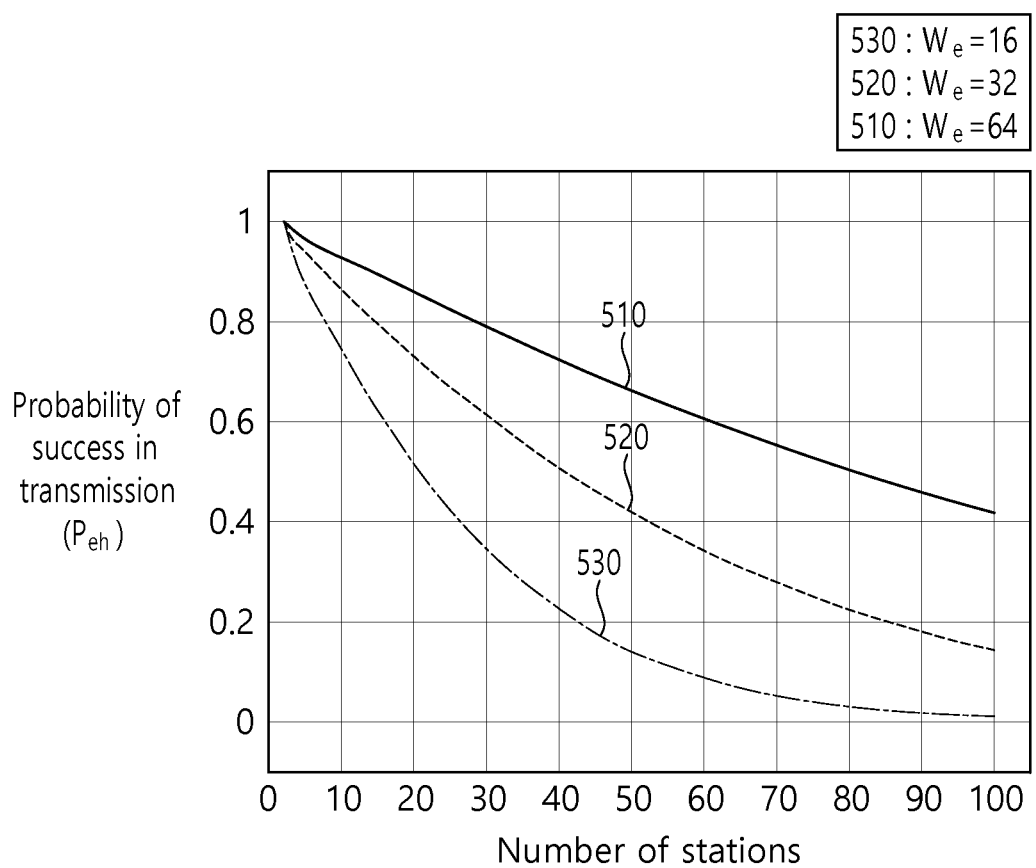
FIG. 5 shows the probability of success in transmission versus number (n) of network-connected stations and energy contention window size (We)

FIG. 5 shows the probability of success in transmission versus number (n) of network-connected stations and energy contention window (We). It shows that the larger $W_e$, the higher $P_{eh}$, and that the larger n, the lower $P_{eh}$. Increasing $W_e$ increases $P_{eh}$ but lengthens the time required for Excuse frame transmission contention. Thus, the AP has to set an appropriate $W_e$ value. Considering the number of stations connected to the network, the ratio between the amount ($E_{con}$) of energy consumed when a station sends data and the amount (Ehar) of energy harvested by receiving an energy RF signal from the PB is set to a value that is smaller than or equal to $P_{eh}$ ($P_{eh} \geq E_{con}/E_{har}$).

If the Excuse frame is successfully received by the PB, the PB determines the direction of energy transfer by checking the address of the station requesting energy transfer through the Excuse frame and determines the duration of energy transfer based on the time when the AP's ACK (acknowledgment) frame transmission ends, by reference to the NAV (network allocation vector) of RTS/CTS frames, to ensure that the channel is used for data transmission. If no Excuse frame is transmitted after the maximum backoff slot time ($T_{ebm}=\delta We$), during which the Excuse frame can be sent, the data transmitting stations and the PB may determine that there is no station that will transmit an Excuse frame, and a station that has won in the data transmission contention transmits data even if it receives no Excuse frame. If no Excuse frame is transmitted or an Excuse frame transmission is not successful due to collision, the PB does not transfer energy. The station that has won in the data transmission contention transmits data to the AP upon finding out that the Excuse frame has been sent, and at the same time, the PB sends an RF energy signal to the station that has sent the Excuse frame by using beamforming technology.

If the channel is free during an EDIFS interval, it can be determined that there is no data transmission from a station, and the channel may be used for energy transfer. The EDIFS interval may be calculated as the sum of DIFS interval and the maximum backoff slot time δWe for data transmission:

$$\text{EDIFS}=\text{DIFS}+\delta W \quad \text{[Equation 2]}$$

If the channel is idle during the EDIFS interval, a station that needs energy may send an energy transfer request by sending an Excuse frame to the PB through backoff contention within a $W_e$ range. Upon receiving the Excuse frame, the PB may transmit energy after checking the address of the station requesting energy transfer through the Excuse frame and determining the direction and duration of energy transfer. At this time, other stations in the network are not able to know whether energy is being transmitted or not, and therefore these stations should be notified of information on the duration and direction of energy transfer before energy transfer. The PB notifies other stations in the network of the duration and direction of energy transfer before transferring energy, through a PB Info frame 600 according to an exemplary embodiment of the present invention.

Figure 6:
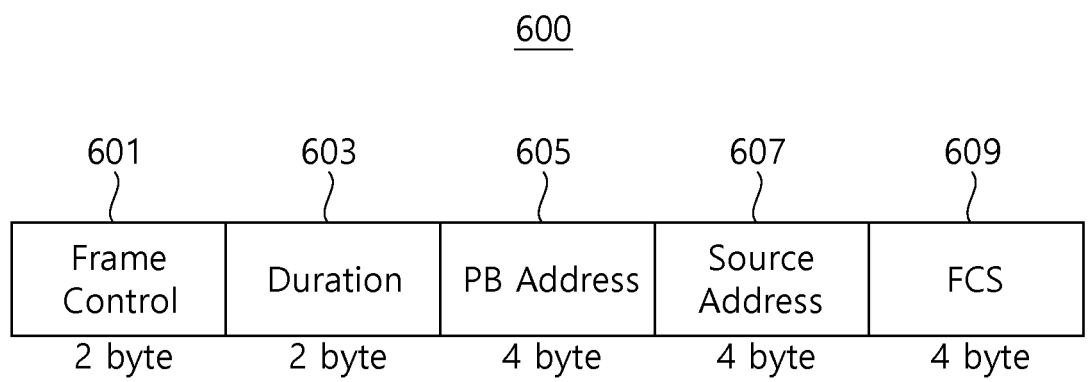
FIG. 6 shows a PB Info MAC frame structure according to an exemplary embodiment of the present invention.

FIG. 6 shows a PB Info MAC frame structure according to an exemplary embodiment of the present invention.

Referring to FIG. 6, the PB Info MAC frame includes a frame control 601, the duration of energy transfer 603, a power beacon (PB) address 605, a destination address 607, and an FCS (frame check sequence) 609. The PB Info MAC frame includes the address 605 of the PB, the destination address 605 indicating the address of the station requesting energy transfer, and the duration of energy transfer 603, in addition to a basic MAC frame structure.

Figure 7:
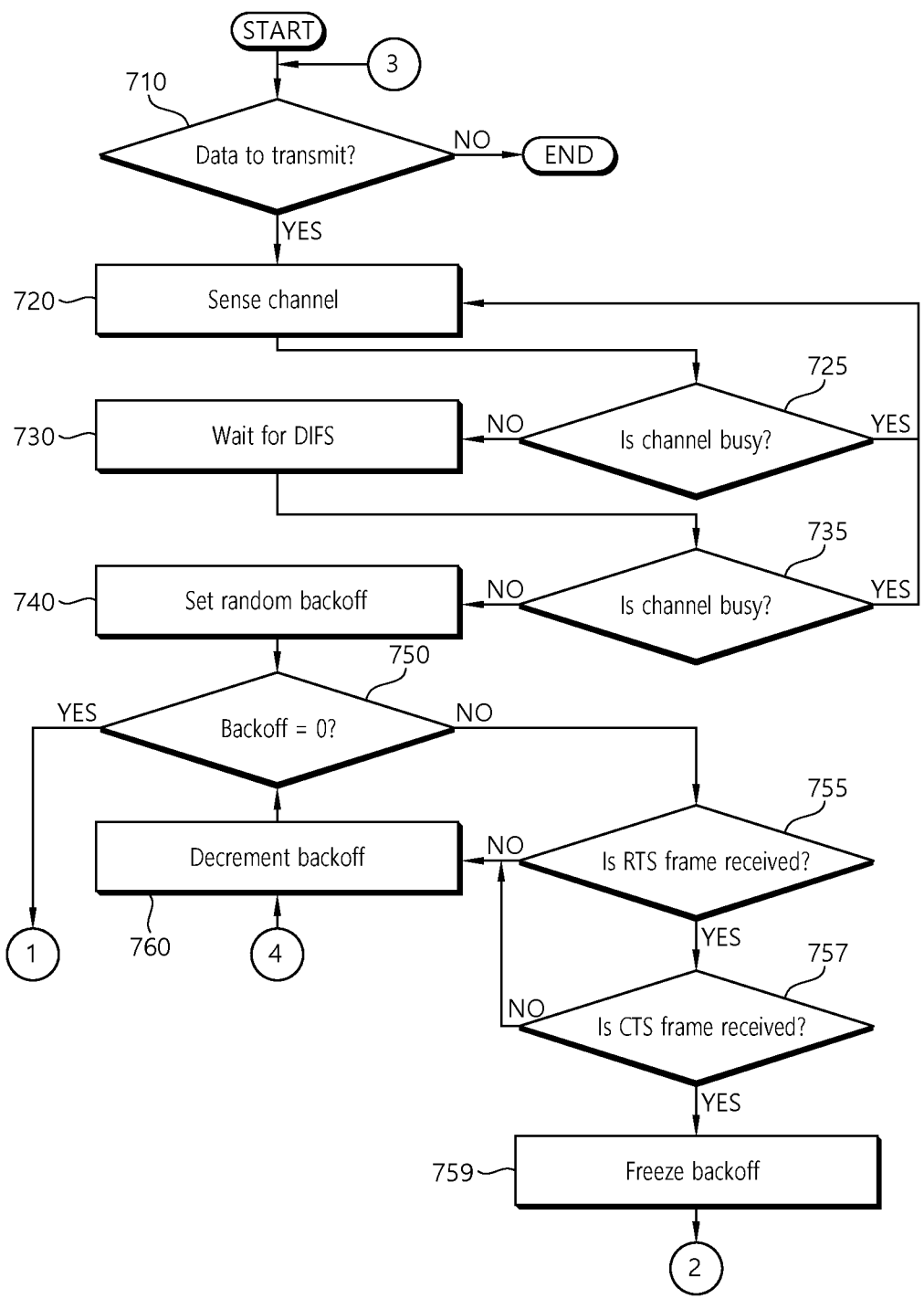
FIGS. 7 to 9 are flowcharts of a data transmission and Excuse frame transmission algorithm for a station according to an exemplary embodiment of the present invention.
Figure 8:
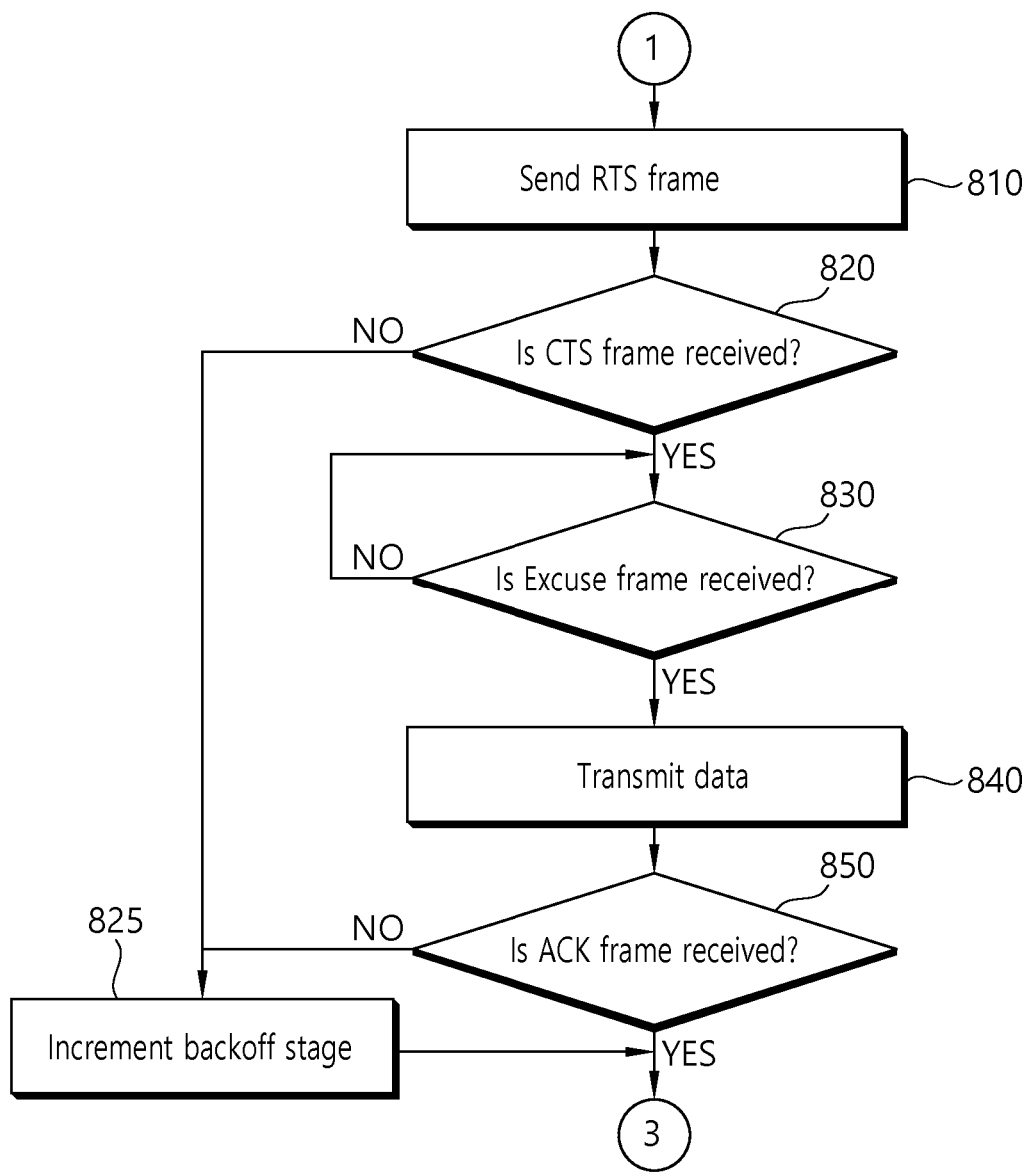
Figure 9:
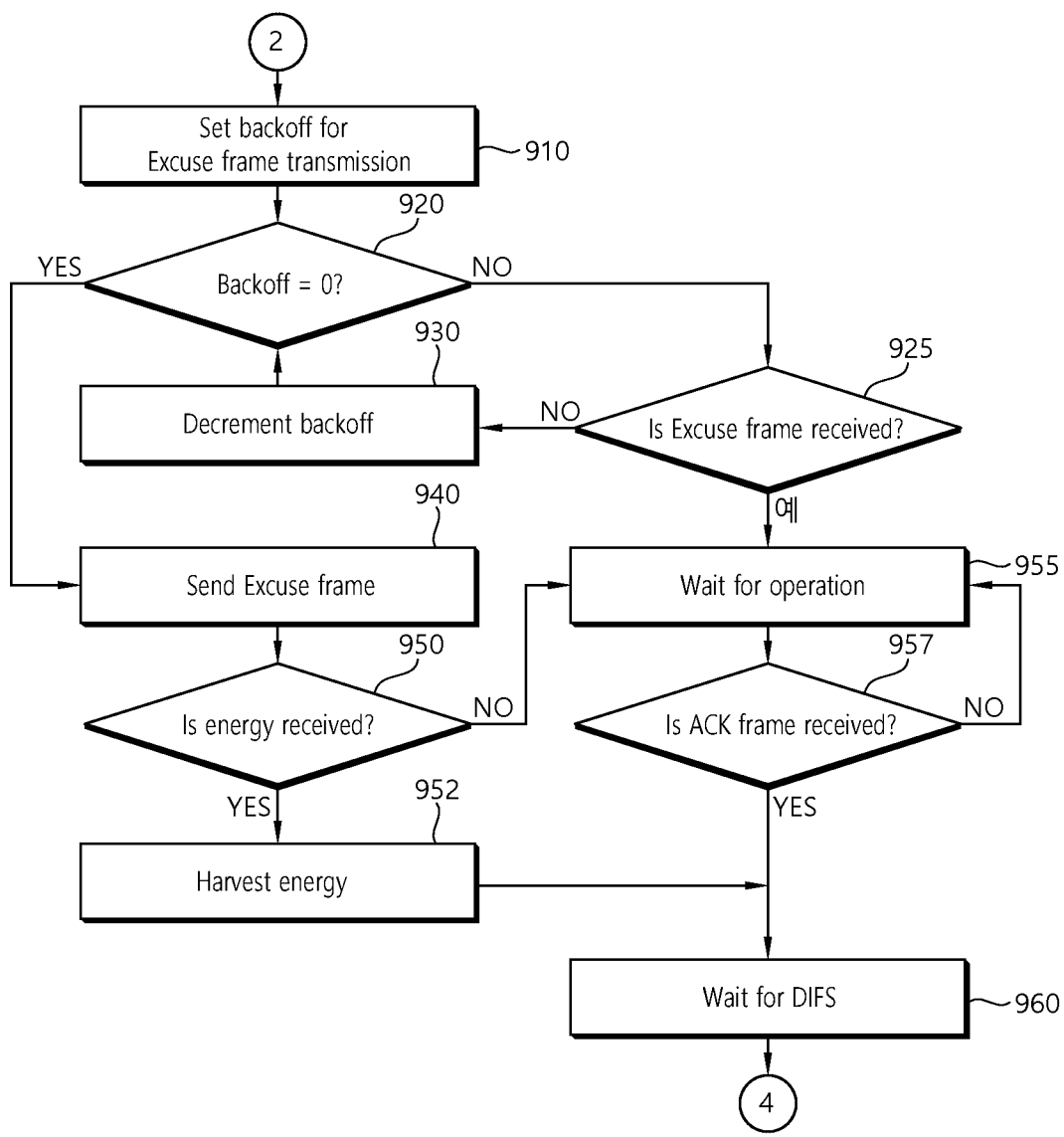
Figure 10:
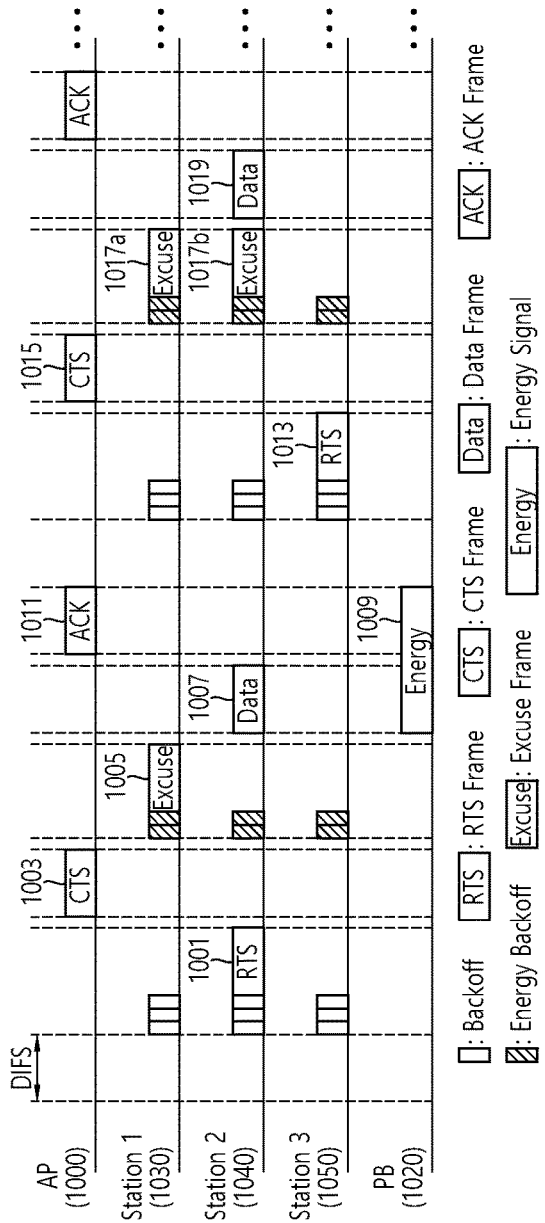
FIG. 10 is a timing diagram of an example of operation when the channel is used for data transmission according to an exemplary embodiment of the present invention.
Figure 10:
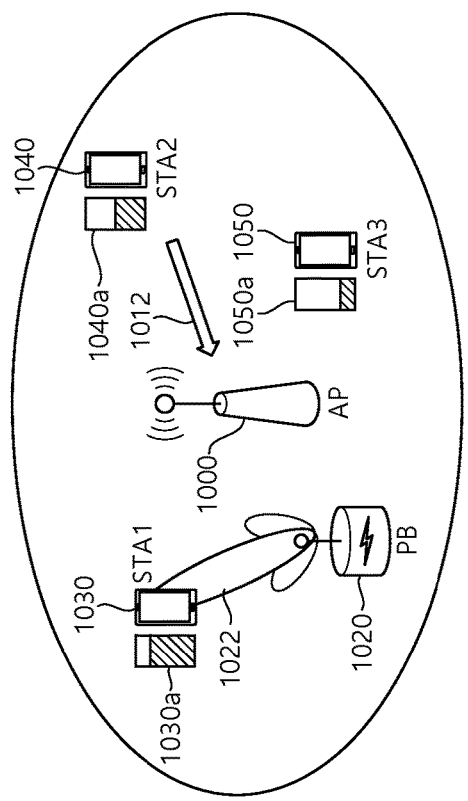

FIGS. 7 to 9 are flowcharts of a data transmission and Excuse frame transmission algorithm for a station according to an exemplary embodiment of the present invention. FIG. 10 is a timing diagram of an example of operation when the channel is used for data transmission according to an exemplary embodiment of the present invention.

It is assumed that, when n stations 1030, 1040, and 1050 (n=3) are connected to the network, the system determines $W_e$ to be equal to 4 so that the condition $P_{eh} \geq \frac{1}{2}$ is met.

Referring to FIGS. 7 to 9, a station detects the presence of data to transmit to the channel (step 720), and if there is data to transmit to the channel, it tries to seize the channel through DCF (distributed coordination function) contention (steps 720, 730, 725, and 735). That is, the station senses the channel (step 720) and checks whether the channel is busy (step 725). If the channel is not busy, the station waits for a DIFS (DCF Interframe space) interval (step 730) and checks whether the channel is busy (or free) (step 735).

If the channel is found idle during the DIFS interval, the station sets a random backoff value (step 740) within a contention window set by the AP when accessing the network, and decrements the backoff value by 1 for each backoff time slot (δ) if the channel is free. When the backoff value reaches 0, the station sends an RTS frame to the AP (step 810).

A station that does not decrement its backoff value to 0 checks whether an RTS frame sent by some other station has been received or not (step 755). If the RTS frame sent by some other station is received, then the station checks whether a CTS frame sent by the AP has been received or not (step 757). If the CTS frame sent by the AP is received, the station then freezes its data backoff (step 759) and contends for an energy transfer request shown in FIG. 9.

Each station contends for backoff to transmit data, and the station whose backoff value reaches 0 first sends an RTS frame 1001 to the AP (step 810 in FIG. 8). If the RTS frame is successfully received, the AP sends a CTS frame over the channel and notifies the stations connected to the network that the channel is occupied for data transmission. Depending on whether the CTS frame is sent or not, the stations may determine whether the RTS frames have collided or not.

By checking whether the CTS frame has been received or not (step 820), the stations find out that no CTS frame has been received due to collision of the RTS frames, and resets the random backoff value by increasing the contention window size—for example, by doubling it—in order to reduce the probability of collision (step 825).

The contention for an energy transfer request shown in FIG. 9 will now be described. As shown in FIG. 7, a station whose data backoff value does not reach 0 freezes its data backoff value, and then contends for an energy transfer request upon receiving a CTS frame sent by the AP.

Stations that have received a CTS frame set a random backoff value within a range to set a backoff value for Excuse frame transmission (step 910), and check if the backoff value is zero by decrementing the backoff value by 1 (step 920). The station whose backoff value reaches 0 first sends an Excuse frame (step 940).

The stations check whether the Excuse frame has been received or not (step 925). If a station whose data backoff value does not reach 0 receives an Excuse frame sent by some other station, it does not decrement the backoff value for Excuse frame transmission any longer but waits without freezing the data backoff value (step 955).

The stations check whether an ACK frame has been received or not (step 957). Upon receiving an ACK frame indicating the end of data transmission, the stations try to contend for data backoff to re-transmit data. That is, if the stations sense that the channel is not busy, they wait for a DIFS (DCF Interframe space) interval (step 960) and check whether the channel is idle during the DIFS interval. If the channel is found idle during the DIFS interval, the stations go back to the step 760 and decrement the backoff value.

If the PB successfully receives an Excuse frame and sends an energy signal, the station that has sent the Excuse frame then checks whether the energy signal has been received (step 950). If the energy signal is received, the station harvests energy through the energy signal (step 952) and then waits for a DIFS interval to transmit data (step 960).

If the station has not received the energy signal, it waits until receiving an ACK frame (steps 955 and 957) and then participates again in data backoff contention (step 960).

Referring to FIG. 10, each station contends for backoff to transmit data, and the station whose backoff value reaches 0 first sends an RTS frame 1001. Upon receiving the RTS frame 1001, the AP 1000 sends a CTS frame and notifies that the channel is occupied for data transmission.

The second station 1040 defers its data transmission until an Excuse frame is sent. The first station 1030 and third station 1050 which have failed the data transmission contention try to transmit an Excuse frame through energy backoff contention within a $W_e$ range. The first station 1030—the station whose energy backoff reaches 0 first—sends an Excuse frame to the PB 1020.

Upon receiving the Excuse frame, the PB 1020 determines the direction of energy transfer by checking the address of the first station 1030 through the Excuse frame. Moreover, the PB 1020 determines the duration of energy transfer based on the time when the transmission of the ACK frame 1011 ends, by reference to the NAV of RTS/CTS frames.

Upon receiving the Excuse frame, the second station 1030 transmits data 1007 to the AP 1000 and at the same time the PB 1020 sends an energy RF signal to the first station 1030 by using beamforming technology. After the data transmission and the energy transfer are finished, the stations start backoff contention for data transmission after finding the channel to be free during an DIFS interval.

The third station 1050—the station whose backoff value reaches 0 first—sends an RTS frame 1013 to transmit data. Upon successfully receiving the RTS frame, the AP 1000 sends a CTS frame 1015 to notify that the channel is occupied, and then the first station 1030 and second station 1040 which have failed the data transmission contention contend for energy backoff for Excuse frame transmission.

When the energy backoff values of the first station 1030 and second station 1040 simultaneously reach 0, Excuse frames 1017a and 1017b are simultaneously sent to the PB 1020, and the PB 1020 cannot successfully receive the Excuse frames due to collision. After transmission of the Excuse frames, the second station 1050 transmits data 1019 and the PB 1020 does not transmit energy.

Figure 11:
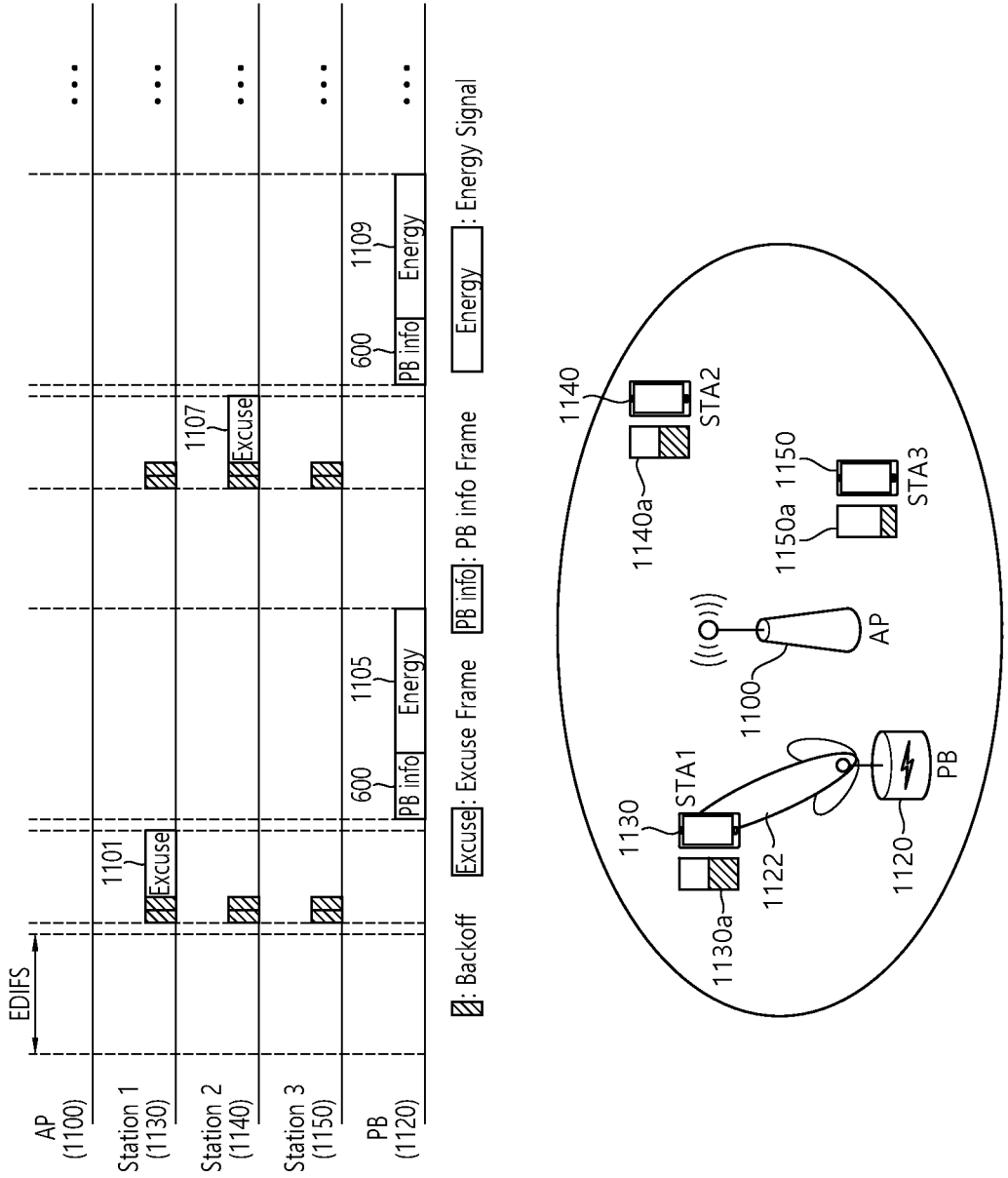
FIG. 11 is a timing diagram of an example of operation when the channel is not used for data transmission (when there is no data transmission) according to another exemplary embodiment of the present invention.

FIG. 11 is a timing diagram of an example of operation when the channel is not used for data transmission (when there is no data transmission) according to another exemplary embodiment of the present invention.

Referring to FIG. 11, when n stations 1130, 1140, and 1150 (n=3) are connected to the network, the stations 1130, 1140, and 1150 try to send an Excuse frame through energy backoff contention within a $W_e$ range upon sensing the channel idle for an EDIFS interval.

When the first station 1130—the station whose backoff value reaches 0 first—sends an Excuse frame 1101 to the PB 1120, then the PB 1120 determines the direction of energy transfer and the duration of energy transfer by checking the address of the first station 1130 through the Excuse frame. The PB 1120 transmits energy after notifying the stations in the network of the duration of energy RF signal transfer through a PB Info frame 600.

The second station 1140 and third station 1140 which have failed the Excuse frame transmission contention may calculate the time when the energy transfer ends, after receiving the PB Info frame 600.

To evaluate the performance achieved by the present invention, a saturation throughput comparison was made by a simulation by using the existing method of power transfer using an omnidirectional antenna while varying the number of stations, without checking whether the channel is busy or not.

In the simulation, the IEEE 802.11 were used in an environment where W is 32 and the maximum backoff stage is 3, and the PB is configured to send an energy RF signal according to a Poisson process where λ=50[jobs/sec].

Figure 12:
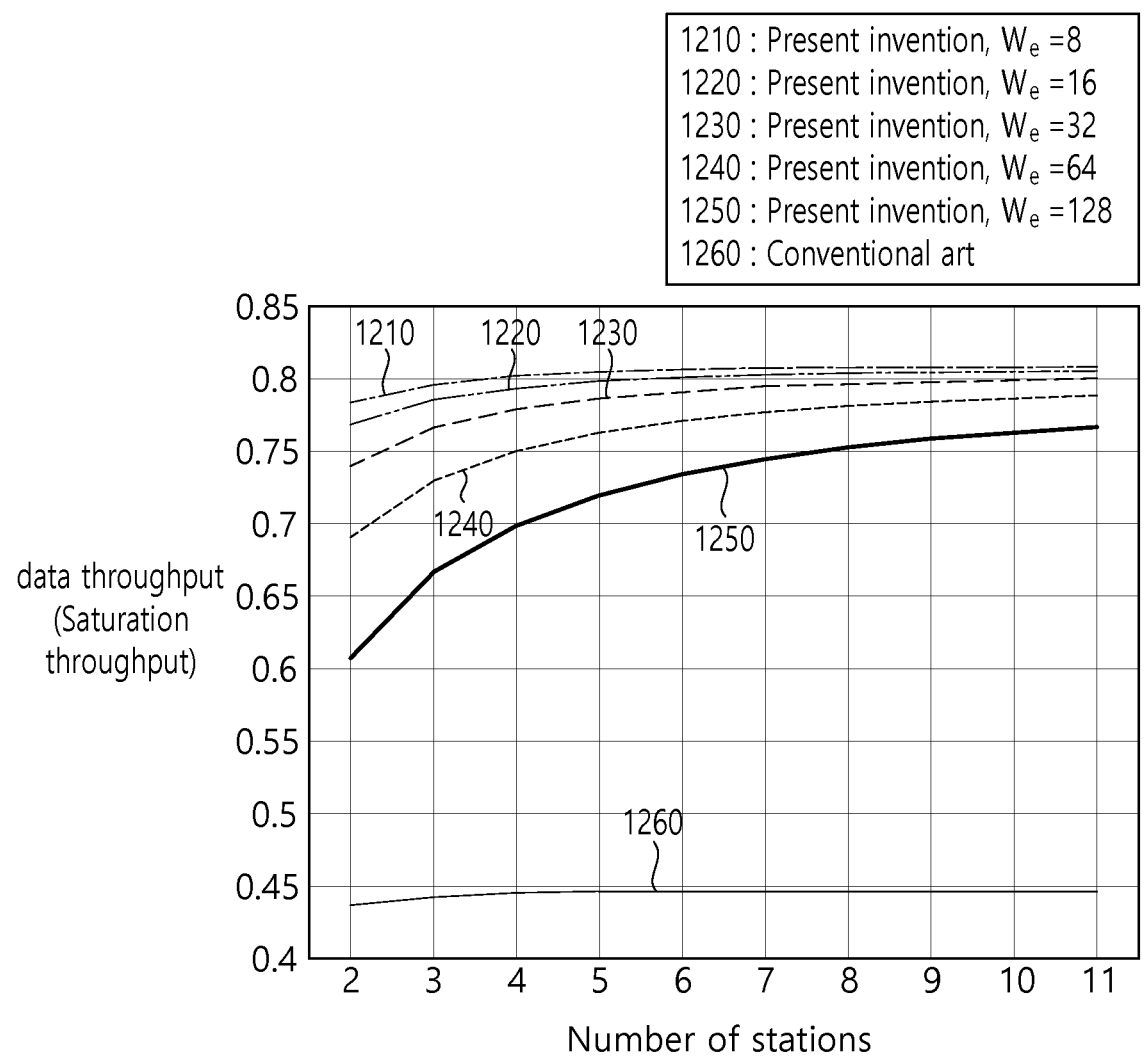
FIG. 12 is a graph showing a comparison of the saturation throughput variation with the number of network-connected stations and the $W_e$ value, between the existing method and the present invention.

FIG. 12 is a graph showing a comparison of the saturation throughput variation with the number of network-connected stations and the $W_e$ value, between the existing method and the present invention.

Referring to FIG. 12, the existing method 1260 showed low saturation throughput because power transfer occurs during data transmission or because data transmission is not possible during power transfer. In contrast, the present invention showed an about 77% increase in data throughput when n=10 and $W_e$=16, because data transmission and power transfer can be performed simultaneously.

As shown in FIG. 12, assume that the number of stations connected to the network is fixed, it was found out that the throughput performance decreases with increasing $W_e$ value, because of the increased time required for Excuse frame transmission contention. On the other hand, as the number of stations connected to the network increases, the likelihood that an Excuse frame will be sent at a low backoff value increases and therefore the differences in saturation throughput decrease but the $P_{eh}$ value decreases too—which is why it is necessary to set an appropriate $W_e$ value depending on the network status.

In the present invention, a data transmission system and a wireless power transfer system are allowed to co-exist on the same channel. An RF power transfer apparatus using beamforming technology is allowed to re-use space to enable power transfer without interference, simultaneously with data transmission, thereby increasing energy transfer efficiency and improving data throughput.

Figure 13:
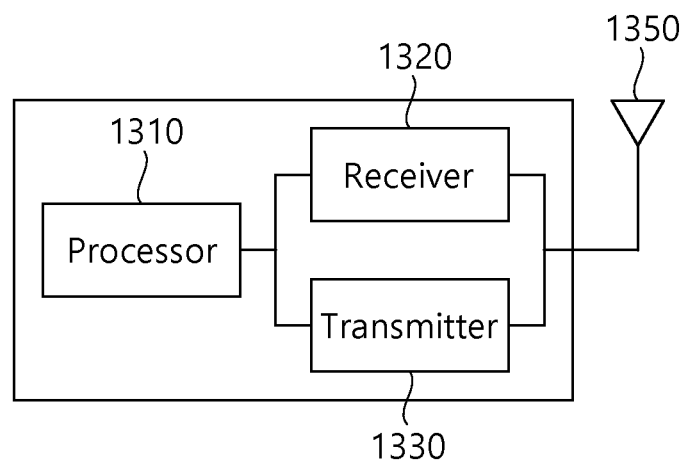
FIG. 13 is a block diagram of an energy signal transfer apparatus for performing wireless power transfer to at least one wireless station connected to a network in the same frequency band as a wireless local area network (WLAN).

FIG. 13 is a block diagram of an energy signal transfer apparatus for performing wireless power transfer to at least one wireless station connected to a network in the same frequency band as a wireless local area network (WLAN).

Referring to FIG. 13, the energy signal transfer apparatus includes a receiver 1320 for receiving an energy transfer request from a wireless station connected to the network, a processor 1310 for calculating at least either the direction of energy signal transfer or the duration of energy transfer in response to the energy transfer request, and a transmitter 1330 for sending an energy signal to the wireless station requesting energy transfer in the direction of energy signal transfer.

The transmitter 1330 may send the energy signal in the calculated direction of energy signal transfer for the duration of energy transfer.

The receiver 1320 may receive an Excuse frame from the wireless station requesting energy transfer, which is transmitted when the energy transfer request is sent. Here, the Excuse frame includes the address of a power beacon (PB) serving as the energy signal transfer apparatus and the address of the wireless station requesting energy transfer.

The processor 130 may calculate the direction of energy signal transfer and the duration of energy transfer by checking the address of the wireless station requesting energy transfer through the Excuse frame.

The processor 1310 may determine the duration of energy transfer based on the time when a wireless channel's data transmission ends—that is, the time when an ACK (acknowledgment) frame transmission ends. If the wireless channel is used for data transmission, the calculated direction of energy signal transfer may be a direction that causes no interference with the data transmission. If the wireless channel is not used for data transmission, other wireless stations in the network may be notified of the duration of energy transfer and the direction of energy signal transfer through a PB Info frame before energy signal transfer. The PB Info frame includes the address of the PB, the address of a first wireless station requesting energy transfer, and the duration of energy transfer, in addition to a basic MAC frame structure.

The energy signal transfer apparatus may be either a power beacon (PB) or an access point (AP) or a wireless station.

According to exemplary embodiments of the present invention, a method of wireless power transfer to at least one wireless station connected to a network from an energy signal transfer apparatus operating in the same frequency band as a wireless local area network (WLAN), and the energy signal transfer apparatus for performing the same are characterized in that, in a wireless power transfer (WPT) energy harvesting system using radio frequency (RF), an energy signal allows for spatial separation of a single channel by beamforming technology. A power beacon (PB) operating in the same frequency band as the wireless local area network (WLAN) allows for power transfer without causing interference with data transmission. Specifically, when a particular station notifies that the channel is occupied for data transmission through contention in the same channel, stations needing energy send an energy transfer request to the power beacon (PB) through contention. Then, the power beacon PB transfers energy only in the direction of the stations requesting energy transfer by using beamforming technology, thereby allowing for power transfer without causing interference with data transmission on a channel where data transmission occurs.

Another advantage of the present invention is that a station that has won in a data transmission contention is guaranteed to use the channel for data transmission, and that stations that have failed the contention may send an energy transfer request for energy harvesting.

Yet another advantage of the present invention is that the power beacon PB may perform power transfer simultaneously to stations requesting energy transfer by spatially separating a data transmission channel. This may increase energy transfer efficiency and improve data throughput compared to the conventional art.

Although the above description has been made with reference to the accompanying drawings and embodiments, the scope of protection of the present invention is not limited by these drawings or embodiments. One skilled in the art will understand that various changes and modifications may be made without departing from the spirt and scope of the present invention as defined by the claims set out below.

What is claimed is:

1. A method of wireless power transfer, the method comprising:
   receiving, by an energy signal transfer apparatus, an energy transfer request and an excuse frame from a wireless station connected to a wireless local area network (WLAN);
   calculating a direction of energy signal transfer based on the excuse frame, in response to the energy transfer request; and
   sending an energy signal from the energy signal transfer apparatus to the wireless station in the calculated direction,
   wherein the energy signal transfer apparatus operates in a same frequency band as the WLAN.

2. The method of claim 1, wherein, when a wireless channel is used for data transmission, the wireless station that is requesting energy transfer fails a data transmission contention.

3. The method of claim 1, wherein, when a wireless channel is not used for data transmission, the wireless station that is requesting energy transfer senses that the wireless channel is free.

4. The method of claim 1, wherein the excuse frame comprises an address of a power beacon (PB) serving as the energy signal transfer apparatus and an address of the wireless station that is requesting energy transfer.

5. The method of claim 4, wherein the calculating of the direction comprises calculating the direction and a duration of the energy signal transfer by checking the address of the wireless station that is requesting energy transfer through the excuse frame.

6. The method of claim 5, wherein the calculating of the duration comprises determining the duration of the energy signal transfer based on a time at which a wireless channel's data transmission ends.

7. The method of claim 1, wherein
when a wireless channel is used for data transmission, the calculated direction is a direction that causes no interference with the data transmission,
when a wireless channel is not used for data transmission, other wireless stations in the WLAN are notified of a duration of the energy signal transfer and the direction through a PB Info frame before the sending of the energy signal, and
the PB Info frame comprises an address of the PB, an address of the wireless station that is requesting energy transfer, and the duration of the energy signal transfer, in addition to a basic MAC frame structure.

8. The method of claim 1, wherein the energy signal transfer apparatus comprises any one of a power beacon (PB), an access point (AP), and a wireless station.

9. The method of claim 1, wherein the excuse frame is transmitted from the wireless station when the energy transfer request is sent.

10. An energy signal transfer apparatus, comprising:
a receiver configured to receive an energy transfer request and an excuse frame from a wireless station connected to a wireless local area network (WLAN);
a processor configured to calculate a direction of energy signal transfer based on the excuse frame, in response to the energy transfer request; and
a transmitter configured to send an energy signal to the wireless station in the calculated direction,
wherein the energy signal transfer apparatus operates in a same frequency band as the WLAN.

11. The energy signal transfer apparatus of claim 10, wherein the transmitter is further configured to send the energy signal in the calculated direction during a duration of the energy signal transfer.

12. The energy signal transfer apparatus of claim 11, wherein
the excuse frame is transmitted when the energy transfer request is sent,
the excuse frame comprises an address of a power beacon (PB) serving as the energy signal transfer apparatus and an address of the wireless station that is requesting energy transfer, and
the processor is further configured to calculate the direction of the energy signal transfer and the duration of the energy signal transfer by checking the address of the wireless station that is requesting energy transfer through the excuse frame.

13. The energy signal transfer apparatus of claim 12, wherein the processor is further configured to determine the duration of the energy signal transfer based on a time at which a wireless channel's data transmission ends.

14. The energy signal transfer apparatus of claim 10, wherein
when a wireless channel is used for data transmission, the calculated direction is a direction that causes no interference with the data transmission, and
when a wireless channel is not used for data transmission, other wireless stations in the WLAN are notified of the duration of the energy signal transfer and the direction through a PB Info frame before the sending of the energy signal, and
the PB Info frame comprises an address of the PB, an address of the wireless station that is requesting energy transfer, and the duration of the energy signal transfer, in addition to a basic MAC frame structure.

15. The energy signal transfer apparatus of claim 10, wherein the energy signal transfer apparatus comprises any one of a power beacon (PB), an access point (AP), and a wireless station.

16. A method of wireless power transfer to a wireless station connected to a wireless local area network (WLAN) from an energy signal transfer apparatus operating in a same frequency band as the WLAN, the method comprising:
receiving an energy transfer request from the wireless station;
calculating a direction of energy signal transfer in response to the energy transfer request; and
sending an energy signal to the wireless station in the calculated direction of the energy signal transfer for a duration of the energy signal transfer,
wherein, when a wireless channel is used for data transmission, the calculated direction of the energy signal transfer is a direction that causes no interference with the data transmission,
wherein, when a wireless channel is not used for data transmission, other wireless stations connected to the WLAN are notified of the duration of the energy signal transfer and the direction of the energy signal transfer through a PB Info frame before the energy signal transfer, and
wherein the PB Info frame comprises an address of the PB, an address of the wireless station that is requesting energy transfer, and the duration of the energy signal transfer, in addition to a basic MAC frame structure.

* * * * *